Jan. 6, 1925.                                                         1,521,691
                              J. W. LITTLE
                                 WHEEL
                          Filed March 7, 1924
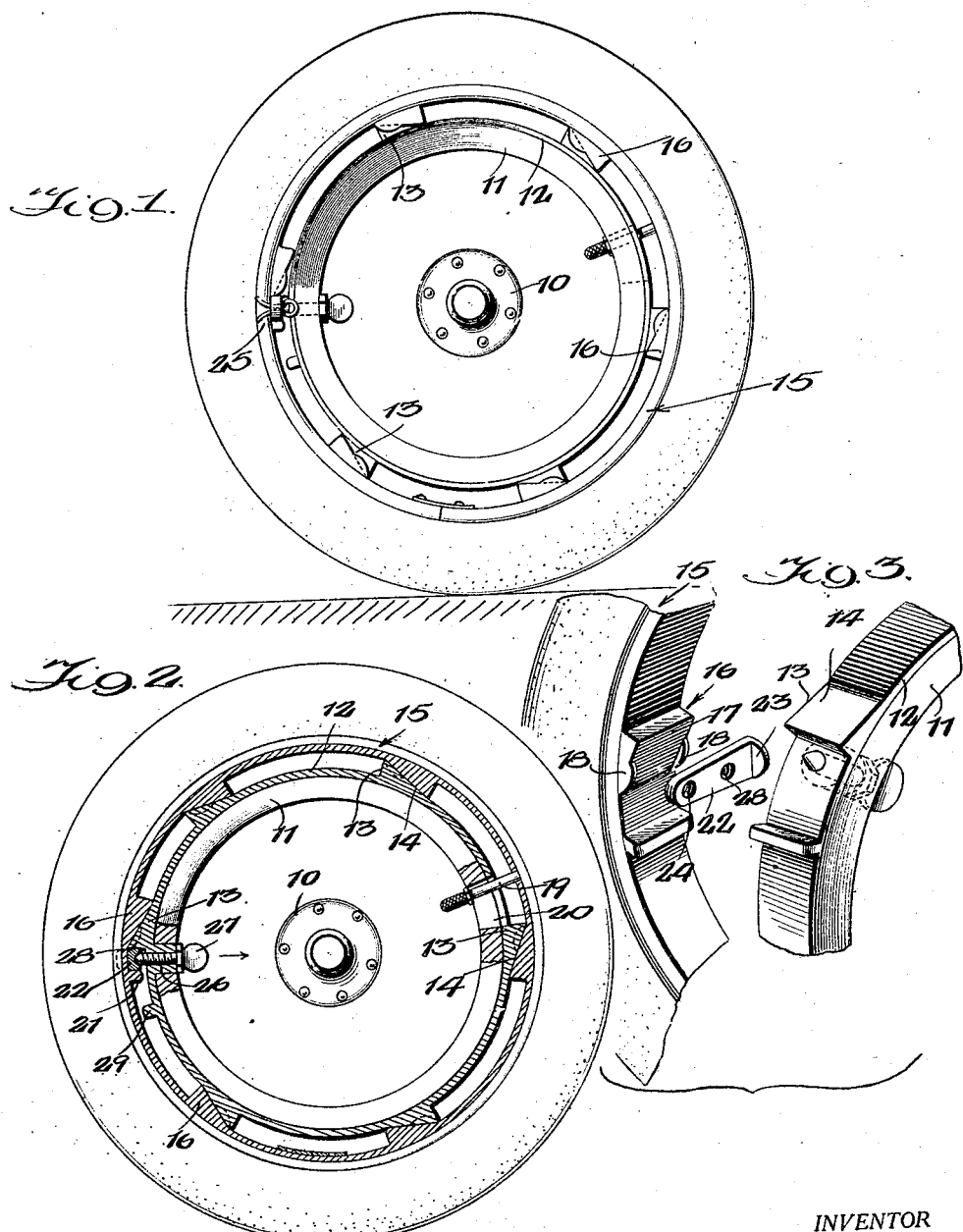
INVENTOR
J. W. LITTLE,
BY
ATTORNEYS Patented Jan. 6, 1925.

1,521,691

UNITED STATES PATENT OFFICE.

JOSEPH WILLIAM LITTLE, OF MUSKOGEE, OKLAHOMA.

WHEEL.

Application filed March 7, 1924. Serial No. 697,585.

*To all whom it may concern:*

Be it known that I, JOSEPH WILLIAM LITTLE, a citizen of the United States, and a resident of Muskogee, in the county of Muskogee and State of Oklahoma, have invented certain new and useful Improvements in Wheels, of which the following is a specification.

This invention relates in general to wheels, and more particularly relates to wheels of the type embodying demountable rims and designed especially for use on automobiles or similar vehicles.

The object of the invention is to provide a wheel of this character wherein a demountable rim is properly supported on the fixed rim of the wheel in such a manner as to preclude the possibility of distortion of the parts and wherein at the same time the demountable rim may be applied to or taken from the wheel quickly and easily and without the use of special tools.

A further object is to provide a wheel of the character specified and having the foregoing enumerated advantages and capacities and which is also of simple and durable construction, reliable in operation, and easy and comparatively inexpensive to manufacture.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a view in side elevation, showing one embodiment of the invention;

Figure 2 is a view in central vertical section, taken in the plane of the wheel; and Figure 3 is a fragmentary group view in perspective illustrating the means employed for releasably locking the demountable rim on the fixed rim.

Referring to the drawings the numeral 10 designates the wheel which may be of any conventional construction and which includes a fixed rim 11. The fixed rim 11 includes a metallic band 12. At spaced intervals around the metallic band 12 of the fixed rim lugs 13 are arranged. These lugs 13 are preferably six in number and are of identical construction. Each lug 13 has an inclined face 14 which merges into the periphery of the metallic band 12 of the fixed rim. The lugs 13 may be welded to the metallic band 12 of the fixed rim or they may be integrally formed therewith or otherwise suitably connected thereto.

A demountable rim, designated generally at 15 is provided and may be of any desired type. At spaced intervals around the inner periphery of the demountable rim lugs 16 are provided, the lugs 16 being welded to the demountable rim or being integral therewith or being otherwise suitably connected thereto. The lugs 16 are also six in number and have inclined faces 17. The faces 17 are oppositely inclined with respect to the faces 14 of the lug 13 so that when the lugs 16 and 13 are brought into engagement, as they are in assembly, they will coact to securely and properly support the demountable rim on the fixed rim. With lugs of this character, the demountable rim may be made to have a strong and durable bearing over a large area on the fixed rim and thus the demountable rim is not only properly supported but the parts are not liable to become distorted.

In order to prevent lateral displacement of the demountable rim on the fixed rim, the lugs 16 are formed at their sides with inwardly extending wings 18 designed to fit down over the lugs 13 and engage the side faces of these lugs 13 for the purpose stated.

It is to be understood that the demountable rim is applied to the fixed rim by moving the demountable rim laterally or axially onto the fixed rim with the lugs 13 and 16 in staggered relation. When the demountable rim has been brought into the plane of the wheel, then the demountable rim is rotated in a counterclockwise direction as viewed in Figures 1 and 2, to bring the lugs 16 into engagement with the lugs 13.

In partaking of these movements the tire valve stem 19 is accommodated in a slot 20 formed in the fixed rim of the wheel.

In order to lock the demountable rim on the fixed rim and yet provide for ready release of these parts a transverse ridge 21 is integrally formed with or suitably connected to the demountable rim 15 adjacent one of the lugs 16. In the assembly this ridge 21 is slightly spaced angularly from one of the lugs 13 of the fixed rim, and in the space between the ridge 21 and the adjacent lug 13 a key 22 is driven. The key 22 is tapered and has one end offset, as at 23, to limit the extent to which it may be driven into the space mentioned. As shown in Figure 2 this key 22 engages the ridge 21 and the adjacent lug 13. At the small end of the key 22 a transverse opening 24 is provided to accommodate a cotter pin 25. Opposite the key 22 a threaded bearing 26 is provided in the demountable rim 11, and in this threaded bearing a set screw 27 is operatively driven. The inner end of the set screw is engageable with a seat 28 provided therefor in the key 22.

A stop 29 is fixed to the metallic band 12 of the fixed rim and is engaged by the vertical face of one of the lugs 16 to limit the movement of the demountable rim about the fixed rim and to afford a gage as to the proper movement of these parts in removing the demountable rim.

It is obvious that with this arrangement the demountable rim may be easily applied and as easily removed and yet the demountable rim is firmly and securely supported in the assembly.

I claim:

In a wheel, a fixed rim having a plurality of inclined lugs on its outer periphery, and a demountable rim having a plurality of correspondingly inclined lugs on its inner periphery, the lugs of the demountable rim being engageable with the lugs of the fixed rim, the lugs having flat and engageable bearing faces, the bearing faces having a transverse extent approximately equal to the transverse extent of the rims, the lugs of the demountable rim having wings at their side edges engageable with the side faces of the lugs of the fixed rim to prevent transverse displacement.

JOSEPH WILLIAM LITTLE.